Sept. 28, 1965  R. C. CUMMING  3,209,252
CATHODE-RAY TUBE FREQUENCY METER HAVING A PAIR
OF DEFLECTION MEANS OF UNEQUAL LENGTH
Filed May 23, 1962

INVENTOR,
RAYMOND C. CUMMING.

BY *Harry M. Saragovitz*

ATTORNEY.

United States Patent Office 3,209,252
Patented Sept. 28, 1965

3,209,252
CATHODE-RAY TUBE FREQUENCY METER HAVING A PAIR OF DEFLECTION MEANS OF UNEQUAL LENGTH
Raymond C. Cumming, Palo Alto, Calif., assignor to the United States of America as represented by the Secretary of the Army
Filed May 23, 1962, Ser. No. 197,206
6 Claims. (Cl. 324—78)

The present invention relates to a frequency meter and more particularly to a cathode-ray deflection device for the display of patterns whose characteristics are a result of the frequencies and amplitude of an applied signal.

Previous frequency-discrimination devices employed pairs of frequency-dependent channels and an amplitude-balancing system that followed a detection network. Such systems, in order to measure frequency over an appreciable dynamic range, require accurate balancing of the responses of the two channels. Matched detectors, matched post-detection rise times and amplifications, and compression of the dynamic range of the input signal were also required in such systems for greater accuracy. A further disadvantage of these devices is that they will not perform properly if more than one signal is present at one time.

The general purpose of this invention is to provide a frequency meter which embraces all the advantages of the prior art devices and possesses none of the aforedescribed disadvantages. To attain this, the present invention uses a simple electron device that can rapidly provide a visual analysis of a signal. For certain signals, the analysis consists of Fourier frequency and amplitude information. For other, more complex signals, a characteristic visual "fingerprint" of the signal is given. Frequency discrimination in this device is the result of the transit-time effect of electrostatic cathode-ray deflection plates. A novel connection of two such deflection-plate pairs, having different lengths, yields a straight-line display whose slope is a function of frequency. The amplitude of the signal affects the length of the straight-line but does not influence its slope. Thus the slope of the straight-line display is a unique function of the frequency of the signal, while its length is a unique function of the amplitude. The frequencies and amplitudes of several sinusoids, simultaneously present, may be read if the frequencies are not harmonically related. Simultaneous, harmonically related frequencies generate a characteristic Lissajous figure. Non-sinusoidal radio-frequency waves create distinctive Lissajous patterns which are very sensitive to slight changes in waveform. The carrier frequency of extremely short R-F pulses may also be measured. The frequency-reading mechanism of the device requires only a few undistorted R-F cycles in order to operate properly.

An object of the present invention is the provision of a simple electron device that can rapidly provide a visual analysis of a signal.

Another object is to provide a frequency meter wherein frequency calibration is insensitive to signal amplitude.

A further object of the invention is the provision of a frequency meter wherein signal amplitude, as well as frequency, may be read.

Still another object is to provide a frequency meter wherein simultaneous signals of different frequencies create a distinctive display.

Still a further object is to provide a frequency meter in which no tuned circuits or other reactive elements are used.

Other objects and features of the invention will become apparent to those skilled in the art as the disclosure is made in the following description of a preferred embodiment of the invention as illustrated in the accompanying sheet of drawing in which.

Figure 1:
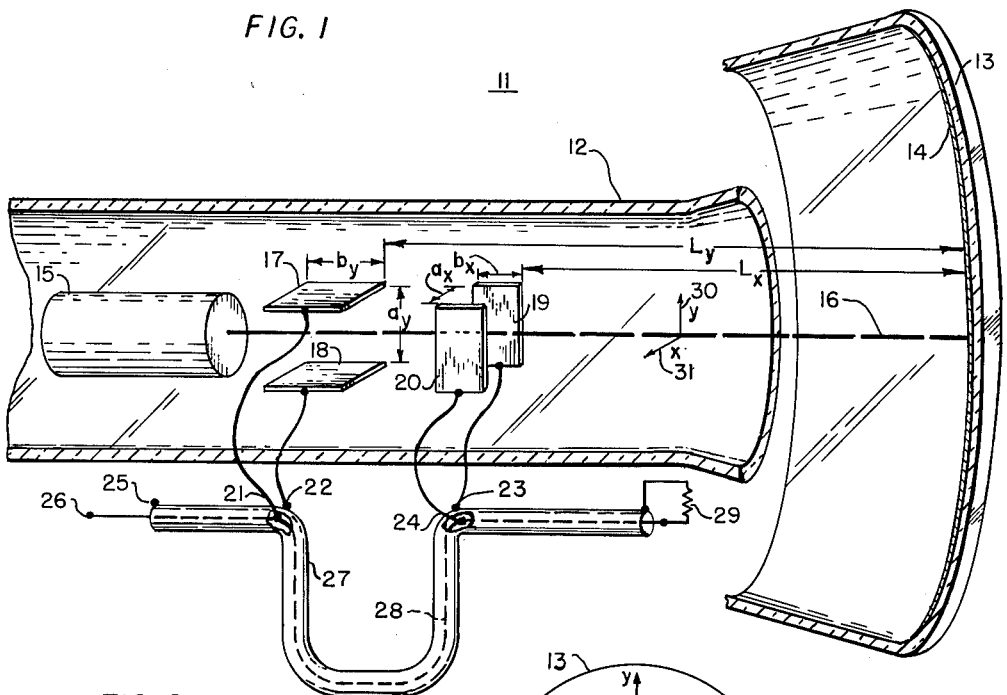
FIGURE 1 shows a sectional view, partly diagrammatic, of a preferred embodiment of the invention.

Referring to the drawings, particularly FIGURE 1, a cathode-ray tube 11 has a neck portion 12 and a face 13. Mounted on the face 13 is a fluorescent screen 14 upon which an electron gun 15, mounted in the neck 12, focuses a beam of electrons 16. A first pair of spaced, parallel deflection plates 17 and 18 are mounted in horizontal planes and separated by a distance $a_y$, in the neck 12 immediately in front of the gun 15 and a distance $L_y$ from the screen 14 so that the electrons 16 will pass between them and be deflected in the "y" direction as indicated by the arrow 30. A second pair of deflection plates 19 and 20 separated by a distance $a_x$ are mounted in a vertical plane immediately in front of the first pair and a distance $L_x$ from the screen 14 in such a manner so that the electrons 16 will pass between them and be deflected in the "x" direction as indicated by the arrow 31. The longitudinal dimension $b_y$ of the first pair is shown as being longer than the corresponding dimension $b_x$ of the second pair of deflection plates, for a purpose which will later become evident.

A delay line in the form of a coaxial line having input terminals 25 and 26 are respectively connected to an outer conductor 27 and an inner conductor 28. The input to the plates is provided by conductors 21–24, connected to the plates 17–20 respectively. Conductors 21 and 24 are tapped off the inner conductor 28 while conductors 22 and 23 are tapped off the outer conductor 27 of the coaxial line. The distance along the coaxial line between these connections, i.e. from the connections of plates 17 and 18 to the connections of plates 19 and 20, should be such as to provide a time delay which is equal to the time it takes an electron to travel from the center of plates 17 and 18 to the center of plates 19 and 20, for a purpose which will be later described. The coaxial line terminates in a matching load 29 for reasons which are considered obvious.

The device is operated by applying a signal, whose frequency is to be displayed on the screen 14, directly to the terminals 25 and 26. The electron gun is activated and a steady beam of electrons 16 is focused on the screen 14. The input signal will travel along the coaxial line and at a time $t_1$ will apply a voltage to plates 17 and 18. At some later time $t_2$ this same signal will be applied to plates 19 and 20 by virtue of the delay imposed on the signal by the coaxial line. Thus, the voltages applied to the plates will be in phase for any given electron. The beam deflection will be frequency sensitive at the operating frequencies of the device because the transit time of the electrons through the plates is appreciable compared to the applied signal.

Assume that the instantaneous voltages $v_x(t)$ and $v_y(t)$, applied to the second set and first set of plates, respectively, vary sinusoidally with time, as $$v_x(t) = V_x \cos(\omega t + \alpha_x) \qquad (1)$$

and $$v_y(t) = V_y \cos(\omega t + \alpha_y) \qquad (2)$$

where $\omega$ is the frequency of the applied signal, $V_x$ and $V_y$ are the respective peak magnitudes of the applied signal voltages, and $\alpha_x$ and $\alpha_y$ are the respective phase angles. The amplitude X and Y of the deflection produced by the parallel-plates will vary with the frequency of the applied sinusoidal voltages of constant peak amplitude according to the relations $$x = x_0 \frac{\sin(\omega T_x/2)}{\omega T_x/2} \tag{3}$$

and $$y = y_0 \frac{\sin(\omega T_y/2)}{\omega T_y/2} \tag{4}$$

where $X_0$ and $Y_0$ are the amplitudes of deflection for frequencies approaching zero, $\omega$ is the angular frequency of the applied deflecting voltages, and $T_x$ and $T_y$ are the transit times of the electron through the deflecting fields. The D.C., or low frequency, deflections $X_0$ and $Y_0$ are $$x_0 = (L_x/2)(b_x/a_x)(V_x/V_0) \tag{5}$$

and $$y_0 = (L_y/2)(b_x/a_y)(V_y/V_0) \tag{6}$$

and the electron transit times through the second and first (X and Y) set of deflection plates are $$T_x = b_x \sqrt{m/2eV_0} \tag{7}$$

and $$T_y = b_y \sqrt{m/2eV_0} \tag{8}$$

where $e/m$ is the electron charge-to-mass ratio, $V_0$ is the D.C. beam accelerating voltage, $b_x$ and $b_y$ are the plate lengths in the direction of the beam, $a_x$ and $a_y$ are the plate separations, and $L_x$ and $L_y$ are the distances from the plate exits to the screen. These physical dimensions are shown in FIGURE 1.

The center frequency of operation of the device is inversely proportional to the transit time in a given pair of deflection plates. Equations 7 and 8 show that the center frequency is, therefore, inversely proportional to deflection-plate length and directly proportional to the square-root of beam voltage. Therefore, the dimensions, $b_y$ and $b_x$ of the plates, and the value of the beam voltage will determine the centre frequency at which the device will operate.

The length of the delay line between the first and second set of deflection-plates, as discussed previously, is chosen to constrain the phase constants $\alpha_x$ and $\alpha_y$ of the input signal in such that the $x$ and $y$ components of deflection of a given electron are in phase. This phase relationship creates a straight line radial display on the screen, when the deflection voltage waveforms are sinusoidal. The slope $\theta$ and the radial length R of the straight line display are given by $$\theta = \tan^{-1}\left(\frac{y}{x}\right) \tag{9}$$

and $$R = \sqrt{x^2 + y^2} \tag{10}$$

It can be seen by combining Equations 3, 4, 5, 6 and 9 that the slope of the straight line display can be expressed as $$\theta = \tan^{-1} \frac{L_y b_y a_x V_y \sin(\omega T_y/2)/(\omega T_y/2)}{L_x b_x a_y V_x \sin(\omega T_y/2)/(\omega T_y/2)} \tag{11}$$

It can be seen by examination of Equation 11, that for a given device with fixed physical dimensions, the slope $\theta$ will vary with frequency if the transit times $T_x$ and $T_y$ through the plates are not equal and the transit time is not negligible compared to the $2\pi/\omega$ of the signal. If however the transit times are equal or negligible the sine function in Equation 11 will cancel and the slope will be $$\theta = \tan^{-1} \frac{L_y b_y a_x V}{L_x b_x a_y V_x} \tag{12}$$

which slope is independent of frequency but dependent only on the physical dimensions of the device and the amplitude of the voltages applied, $V_x$ and $V_y$. The impedance of each set of plates and their connections are made equal so that the voltages $V_y$ and $V_x$ are equal and therefor only the frequency will vary the slope of the straight-line display for any given device. The radial length of the straight-line display however, will be dependent upon the amplitude of the applied voltages $V_y$ and $V_x$.

Figure 2:
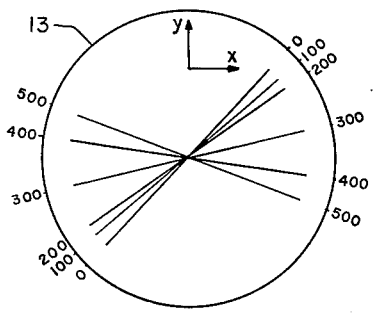
FIGURES 2 to 5 illustrate the displays obtained during the analysis of various signals.
Figure 4:
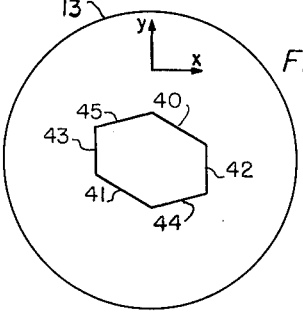
Figure 3:
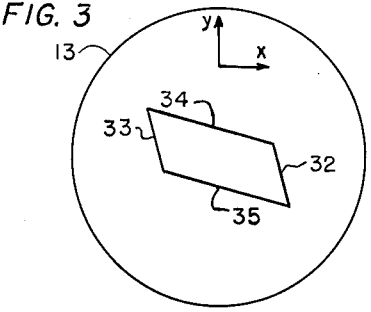
Figure 5:
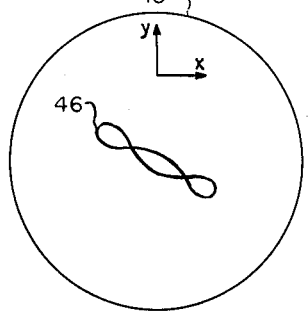

FIGURE 2 shows how the slope of the straight line display will vary when six separate signals having frequencies from 0–500 mc. are applied to a typical device. FIGURE 3 shows a parallelogram-shaped display produced by the simultaneous application of two sinusoids not integrally related in frequency. The slope of one pair of parallel sides 32 and 33 indicates the frequency of one of the applied signals, while the slope of the other pair 34 and 35 indicates the other signal frequency. The application of three sinusoids having nonintegrally related frequencies will result in a display such as shown in FIGURE 4 having sides 40–45. The slopes of the three pairs of parallel sides which form the outlines of the display indicates the three respective frequencies of the signals applied. The application of $n$ sinusoids will result in a display having $2_n$ sides. The Lissajous figure 46 shown in FIGURE 5 is a result of the application of a non-sinusoidal wave consisting of a fundamental and a third harmonic. Every signal having a combination of harmonically related sinusoids will have its own distinct display.

Obviously many modifications and variations of the present invention are possible in the light of the above teachings. For example other delay means could be substituted for the coaxial cable such as a parallel strip transmission line or a L.C. network. In general, the delay means may create a voltage ratio $V_y/V_x$ which is frequency dependent, but not amplitude dependent. The frequency dependence could then be allowed for in calibrating the meter. Electrical, rather than visual, readout of frequency could be obtained by use of an arrangement of radial electrodes in place of the screen. Most of the electrons from a given straight line electron pattern would fall on a particular electrode, the current from which would represent a quantized indication of the signal frequency. Cathode-ray storage and scan-conversion techniques offer further methods for electrical information processing. Also, either set of plates could be made the longer pair. Various other modifications are contemplated and may obviously be resorted to by those skilled in the art without departing from the spirit and scope of the invention, as hereinafter defined by the appended claims as obviously a preferred embodiment thereof has been disclosed.

Having thus described the invention, what is claimed is:

1. A frequency meter comprising; a cathode-ray tube including two pairs of deflection plates for deflection of a beam of electrons in two planes which are perpendicular, the impedance of one of said pair of plates being equal to the impedance of the other of said pair of plates, the length of said one pair of plates being longer than the other of said pair of plates in the direction of beam travel, a signal input means, and means for connecting said one pair of plates across said signal input means and for connecting said other pair of plates across said signal input means.

2. A frequency meter according to claim 1 and wherein said connecting means comprises; a delay line means connecting said one pair of plates to said other pair of plates for providing a time delay which is equal to the transit time for an electron to travel from the center of said one pair of plates to the center of said other pair of plates.

3. A cathode-ray tube frequency meter comprising: means mounted in one end of said tube for focusing a beam of electrons along the axis formed by the line of intersection of first and second orthogonally spaced longitudinal planes of said tube and onto a screen mounted at the other end of said tube; first and second deflection means mounted between said ends of said tube for deflecting said beam of electrons in directions parallel to said first and second planes respectively; said first deflection means being axially longer than said second deflection means, a pair of input terminals, and a pair of signal input lines connected to said terminals, said first and second deflection means being connected across said pair of lines at first and second locations respectively.

4. The frequency meter according to claim 3 wherein said first deflection means is axially spaced from said second deflection means, and further including means for providing a time delay between said first location and said second location, and wherein said time delay is equal to the transit time between said deflection means for an electron in said beam.

5. The frequency meter according to claim 3 and wherein said first and second deflection means each comprise a pair of plates mounted on opposite sides of said second and first planes respectively.

6. The frequency meter according to claim 5 wherein said pair of lines form a delay line between said first and second locations, said first deflection means being axially spaced from said second deflection means, and said delay line providing a time delay equal to the transit time between said deflection means for an electron in said beam.

References Cited by the Examiner
UNITED STATES PATENTS

| | | | |
|---|---|---|---|
| 2,254,023 | 8/41 | Wright et al. | 324—81 |
| 2,457,136 | 12/48 | Earp | 324—88 X |
| 2,515,221 | 7/50 | Henning | 324—88 X |
| 2,602,836 | 7/52 | Foster et al. | 324—77 |
| 2,923,882 | 2/60 | Bradford | 324—77 |
| 3,108,222 | 10/63 | Jaffe et al. | 324—77 |

WALTER L. CARLSON, *Primary Examiner.*